United States Patent [19]

Ueta et al.

[11] Patent Number: 5,748,800

[45] Date of Patent: May 5, 1998

[54] IMAGE READING DEVICE THAT SELECTIVELY PERFORMS EDGE CONTRAST ADJUSTMENT

[75] Inventors: Souichi Ueta; Hayato Hokoi, both of Kanagawa-Ken, Japan

[73] Assignee: Nikon Corporation, Tokyo, Japan

[21] Appl. No.: 354,797

[22] Filed: Dec. 12, 1994

[30] Foreign Application Priority Data

Dec. 13, 1993 [JP] Japan ................................... 5-311382
Aug. 12, 1994 [JP] Japan ................................... 6-190225

[51] Int. Cl.$^6$ ............................ H04N 1/40; H04N 1/38; G06K 9/40
[52] U.S. Cl. .......................... 382/266; 358/447; 358/448; 358/463
[58] Field of Search .......................... 382/266, 270, 382/274; 358/465, 466, 448, 447, 434, 443, 455, 463

[56] References Cited

U.S. PATENT DOCUMENTS 4,700,399  10/1987  Yoshida ........................ 382/266
5,381,490  1/1995  Shin ............................. 382/266

FOREIGN PATENT DOCUMENTS 63-3563  1/1988  Japan ............................. H04N 1/40

*Primary Examiner*—Edward L. Coles, Sr.
*Assistant Examiner*—Kimberly A. Williams
*Attorney, Agent, or Firm*—Oliff & Berridge PLC

[57] ABSTRACT

An image reading device selectively performs contrast adjustment on edge portions of the image, while suppressing contrast adjustment on noise and roughness of the image, thus obtaining a smooth and modulated image. Light emitted from a light source passes through or is reflected from an original document and is incident on a CCD line sensor, which outputs an electrical signal. This signal is input into an edge contrast unit, e.g., via a gain control amplifier, an A/D converter and a CCD signal processor. The edge contrast unit includes a computation unit by which edge contrast adjustment is accomplished selectively on input signals based on a comparison coefficient input from a comparison coefficient input unit and a contrast coefficient input from a contrast coefficient input unit. The resulting signal is stored in FIFO memory after passing through a normalizing processor, a DPI converter, and a LUT, for example.

22 Claims, 6 Drawing Sheets

 FIG.6A OUTPUT OF ELEMENT 7 USED FOR IMAGE READING
 FIG.6B OUTPUT OF ELEMENT 8 USED FOR BLURINESS
 FIG.6C OUTPUT OF SUBTRACTION UNIT
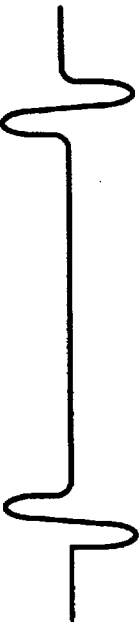 FIG.6D OUTPUT OF GAIN CONTROL AMPLIFIER 22
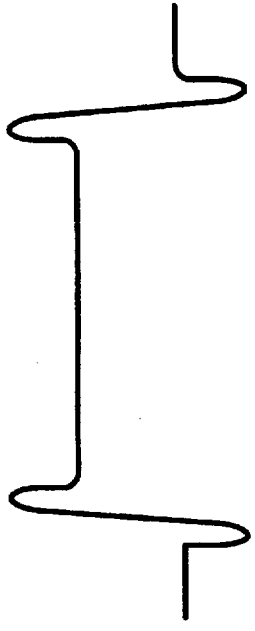 FIG.6E OUTPUT OF ADDITION UNIT 13

IMAGE READING DEVICE THAT SELECTIVELY PERFORMS EDGE CONTRAST ADJUSTMENT

BACKGROUND OF THE INVENTION

1. Field of the Invention

The present invention relates to an image reading device that reads the images of an original document.

2. Description of Related Art

The basic structure of one type of a conventional image reading device is shown in FIG. 5. In FIG. 5, the film 3 (an original document) is illuminated by light emitted from the light source 1 that has been collected by the illuminating optical system 2. Light that passes through the film 3 is collected by a tele-centric imaging optical system 4, and is incident on a partially transparent film 6 via a diaphragm 5 provided at the focussing position of the tele-centric imaging optical system 4.

Part of the light incident on the partially transparent film 6 is reflected while part passes through the film 6. The part of the light that passes through the film 6 is formed as an image on a photosensor 7 used for image reading. On the other hand, the light reflected by the partially transparent film 6 is incident on a photosensor 8 used for blurriness detection, positioned a predetermined distance from the position where the image of the light is composed. Accordingly, a signal is output from the photosensor 8 used for blurriness detection.

The signal (FIG. 6A) output from the photosensor 7 used for image reading and the signal (FIG. 6B) output from the photosensor 8 used for blurriness detection are input into a subtraction unit 12, the signal output from the photosensor 8 used for blurriness detection being subtracted from the signal output from the photosensor 7 used for image reading. The subtracted signal (FIG. 6C) is output to a gain control amplifier 22.

In addition, the diaphragm value of the diaphragm 5 is detected by a diaphragm value detector 9, the output of the diaphragm value detector 9 being input into a correction circuit 23. The correction circuit 23 pre-stores in memory the gain of the gain control amplifier 22, which creates a specified blurriness even if the diaphragm value changes. Using the stored value, correction circuit 23 produces a correction signal to control the gain to a value corresponding to the diaphragm value, the signal being output to the gain control amplifier 22.

The gain control amplifier 22 is controlled by the correction signal from the correction circuit 23, and amplifies the input signal to a predetermined amplitude (FIG. 6D), the signal being output to the input terminal of an addition unit 13. In addition, the signal output from the photosensor 7 used for image reading is also input directly into another input terminal of the addition unit 13. The output signal from the gain control amplifier 22 and the output signal from the photosensor 7 used for image reading are added together, the signal then being output (FIG. 6E).

The signal output from the addition unit 13 is comprised of an image signal in which a contrast is made of the outline of the image on the film 3.

However, such a conventional image reading device accomplishes this outline (i.e., edge) contrast operation equally on all parts of an image that is read using the signal output from the photosensor 7. That is, the outline (edge) contrast operation is performed on all parts of the image, even when some of these parts of the image do not have a high contrast. Consequently, the problem arises that outline (edge) contrast is also accomplished on, for example, the noise generated from electrical circuits within the image reading device, noise from the dark areas of the CCD, and the roughness of the original caused by screen points (for example, dust, dirt, etc.) in the original and photosensitive particles in the film.

SUMMARY OF THE INVENTION

In this regard, an object of the present invention is to suppress edge contrast from being performed on the results of roughness of the original document and noise, and to enable the performance of selective edge contrast adjustment for relatively high quality parts of the image.

In order to achieve the above and other objects, and to overcome the shortcomings in the prior art, an image reading device according to embodiments of the present invention performs an edge contrast operation based on the signals output by a plurality of adjacent photosensor elements. In particular, edge contrast adjustment is only performed when the difference between the signals output by adjacent elements of a CCD line sensor are above a predetermined level. An image reading device in accordance with the invention includes a light source that illuminates an original. A photosensor device (e.g., a CCD (charge-coupled device) line sensor) comprised of a plurality of elements (i.e., photosensor elements) outputs a signal corresponding to the amount of light from an original received by the photosensor device. A determination device (e.g., a comparator) determines whether to accomplish an edge contrast operation on the basis of the difference between the amount of light detected by a first element of the photosensor device and elements adjacent to the first element (i.e., the determination device compares the output signals generated by adjacent elements in the photosensor device). An edge contrast unit performs an edge contrast operation for the signals output by the photosensor device in accordance with the determination made by the determination device.

The determination device determines that edge contrast should be performed when the size of the difference in signals output from adjacent elements of the photosensor device is greater than a preset value. The determination device determines that edge contrast should not be performed when the difference is smaller than the preset value.

With the image reading device having the structure described above, the original is illuminated by light from the light source. Light from the original reaches a CCD line sensor. The CCD line sensor outputs signals corresponding to the amount of incident light it receives. A comparator determines whether to perform an edge contrast operation on the basis of the difference between the signals output by adjacent elements in the CCD line sensor. The edge contrast unit then performs edge contrast on the signals output by the CCD line sensor when the comparator determines that edge contrast should be accomplished, and does not accomplish edge contrast on the signals output by the CCD line sensor when the comparator determines that an edge contrast operation should not be accomplished.

Accordingly, the edge contrast operation is suppresses (i.e., inhibited) when differences between the outputs of adjacent photosensor elements results from noise generated by the electrical circuits within the image reading device, noise from the dark areas of the CCD, and for areas such as those where there is roughness in the original. Accordingly, edge contrast can be performed selectively for the relatively high quality portions of the original.

BRIEF DESCRIPTION OF THE DRAWINGS

The invention will be described in conjunction with the following drawings in which like reference numerals designate like elements and wherein:

FIGS. 6A–6E are signal waveform diagrams at various locations in a conventional image reading device of FIG. 5.

DETAILED DESCRIPTION OF PREFERRED EMBODIMENTS

Figure 1:
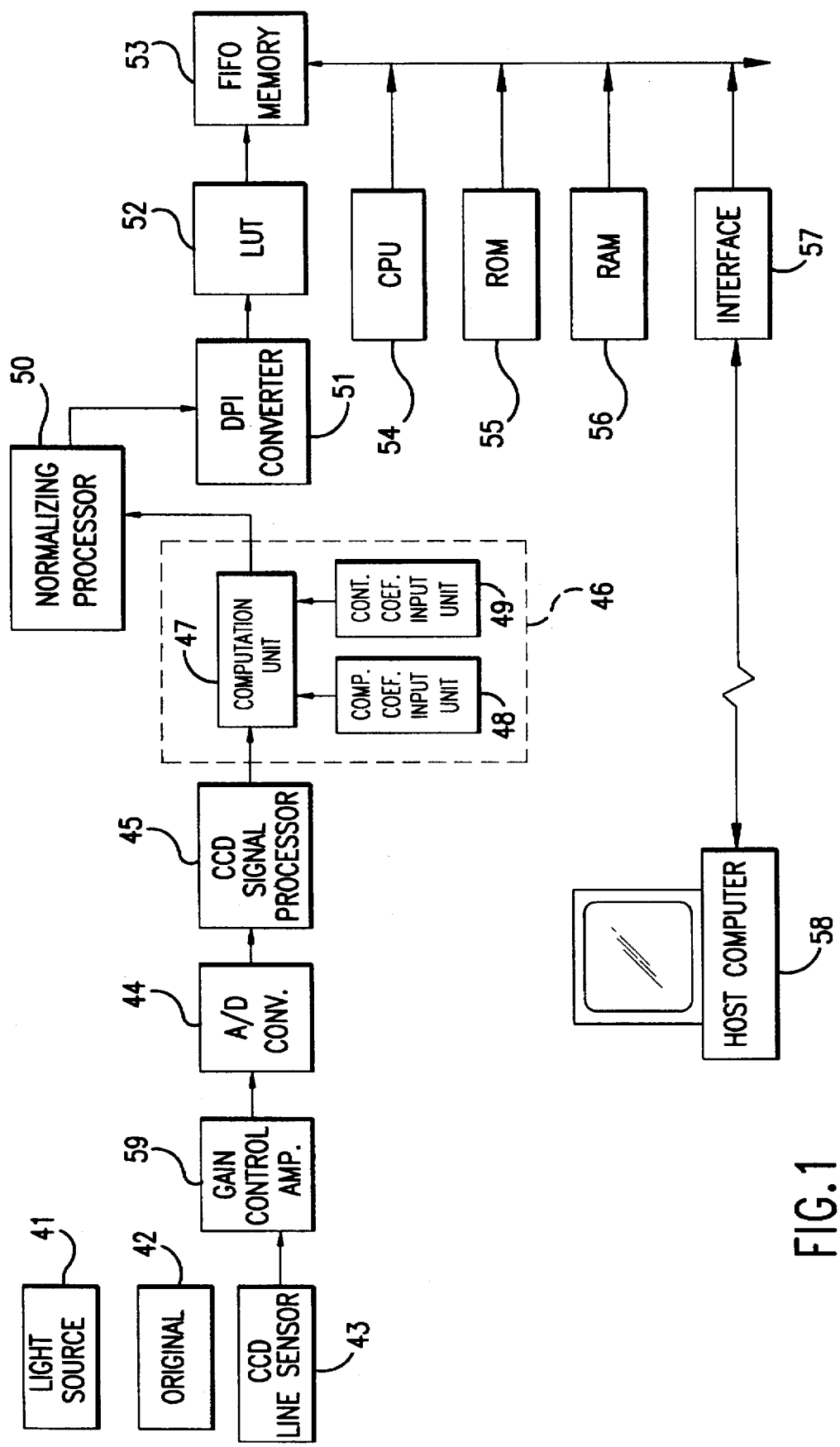
FIG. 1 is a block diagram showing the structure of an image reading device according to an embodiment of the present invention.

FIG. 1 shows the basic structure of an image reading device according to an embodiment of the invention. The image reading device includes a light source 41 which emits light, a CCD (charge-coupled device) line sensor 43, which receives light that has illuminated an original document 42, the light either passing through or being reflected from the original 42. CCD line sensor 43 outputs signals in accordance with the amount of light it receives. A gain control amplifier 59 amplifies by a preset amplitude the level of the signal output from the CCD line sensor 43. An A/D (analog-to-digital) converter 44 converts the signal output from the gain control amplifier 59 into a digital signal, and outputs the digital signal to a CCD signal processor 45. The CCD signal processor 45 performs dark current correction and shading correction on the signal output from the A/D converter 44.

In addition, the image reading device includes an edge contrast unit 46 that performs an edge contrast operation on signals that it receives from the CCD signal processor 45. A computation unit 47 in the edge contrast unit 46 performs edge contrast operations on signals input from the CCD signal processor 45 on the basis of a comparison coefficient T0 and a contrast coefficient K. The comparison coefficient T0 is input from a comparison coefficient input unit 48 and is used to determine whether to accomplish edge contrast. The contrast coefficient K is input from a contrast coefficient input unit 49 and is used to determine the edge contrast level.

A normalizing processor 50 smoothly normalizes the signals output from the computation unit 47. A DPI (dots-per-inch) convertor 51 converts signals received from the normalizing processor 50 into signals having a predetermined resolution. A LUT (look up table) modulates the white balance in signals received from the DPI convertor 51, changes the gradation of the signal level and accomplishes negative-positive conversion. The signals output from the LUT 52 are stored as image data in a FIFO (first-in first-out) memory 53. The CPU 54 controls the operations of the image reading device following a system program stored in the ROM 55 and application programs stored in the RAM 56. Furthermore, the data stored in the FIFO memory 53 and the data stored in the RAM 56 can be read from or written to using a host computer 58 via an interface 57.

Hereinafter, the operations of the image reading device will be described. First, the user inputs a preset value as the comparison coefficient T0 using the comparison coefficient input unit 48, which can be, for example, a keyboard or other means for inputting data. The input unit 48 also could be a multi-position switch. The user also inputs a preset value as the contrast coefficient K using the contrast coefficient input unit 49, which can be similar to input unit 48.

Light emitted from the light source 41 illuminates the original 42. Light that either passes through or is reflected from the original 42 is incident on the CCD line sensor 43. The CCD line sensor 43 generates a signal in accordance with the amount of incident light, the signal from the CCD line sensor 43 being input into the gain control amplifier 59 and being amplified by a preset amplitude. The amplified signal is converted into a digital signal by the A/D converter 44 and is input into the CCD signal processor 45. The CCD signal processor 45 performs shading correction and dark current correction on the input signal, the corrected signal being input into the computation unit 47 of the edge contrast unit 46.

Details of the operations performed in the edge contrast unit 46 are described hereafter. First, the signal input into the computation unit 47 of the edge contrast unit 46 undergoes preset computations, detailed below. Next, the computation results are compared to the comparison coefficient T0, and when the result is a determination that edge contrast should be performed, a computation is performed using the contrast coefficient K, whereas if a determination is made that edge contrast should not be performed, the input signal is output unchanged.

Figure 2:
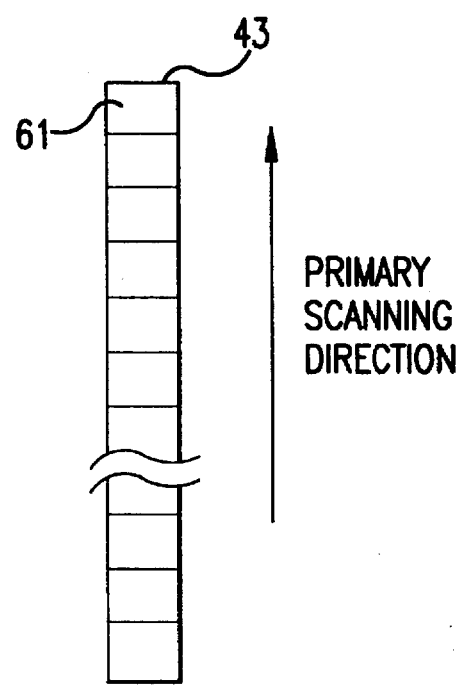
FIG. 2 illustrates the structure of the CCD line sensor shown in FIG. 1.

The output signal is input into the normalizing processor 50, in which a process is accomplished wherein the level of the signal generated from one preset element 61 (see FIG. 2) in the CCD line sensor 43 corresponding to the brightness of a very small predetermined portion of the original is replaced by a normalized (for example, averaged) value from the level of signals generated from the adjacent two elements. This process is accomplished for each of the elements 61 in the CCD line sensor 43. By accomplishing this process for all of the regions of the surface of the original, it is possible to suppress the generation of image roughness and noise from electric circuits or moire fringes.

The signal output from the normalizing processor 50 is input into the DPI converter 51. In the DPI converter 51, a process such as linear interpolation or extraction is accomplished on the input signal to convert the input signal into a signal representing an image having a predetermined resolution, the signal being output to the LUT 52. The LUT 52 changes the gradation of the input signal level (e.g., changes to 5 steps the gradation of a signal level having 10 steps) or performs a negative-positive conversion (e.g., reverses the polarity of the signal level) on the input signal, and the resulting signal is output to the FIFO memory 53.

The signal output from the LUT 52 is temporarily stored as image data in the FIFO memory 53, the stored image data being read and processed by the CPU 54. The data can also be read and processed by the host computer via the interface 57, the CPU 54 controlling all of the circuits in the present device.

Figure 3:
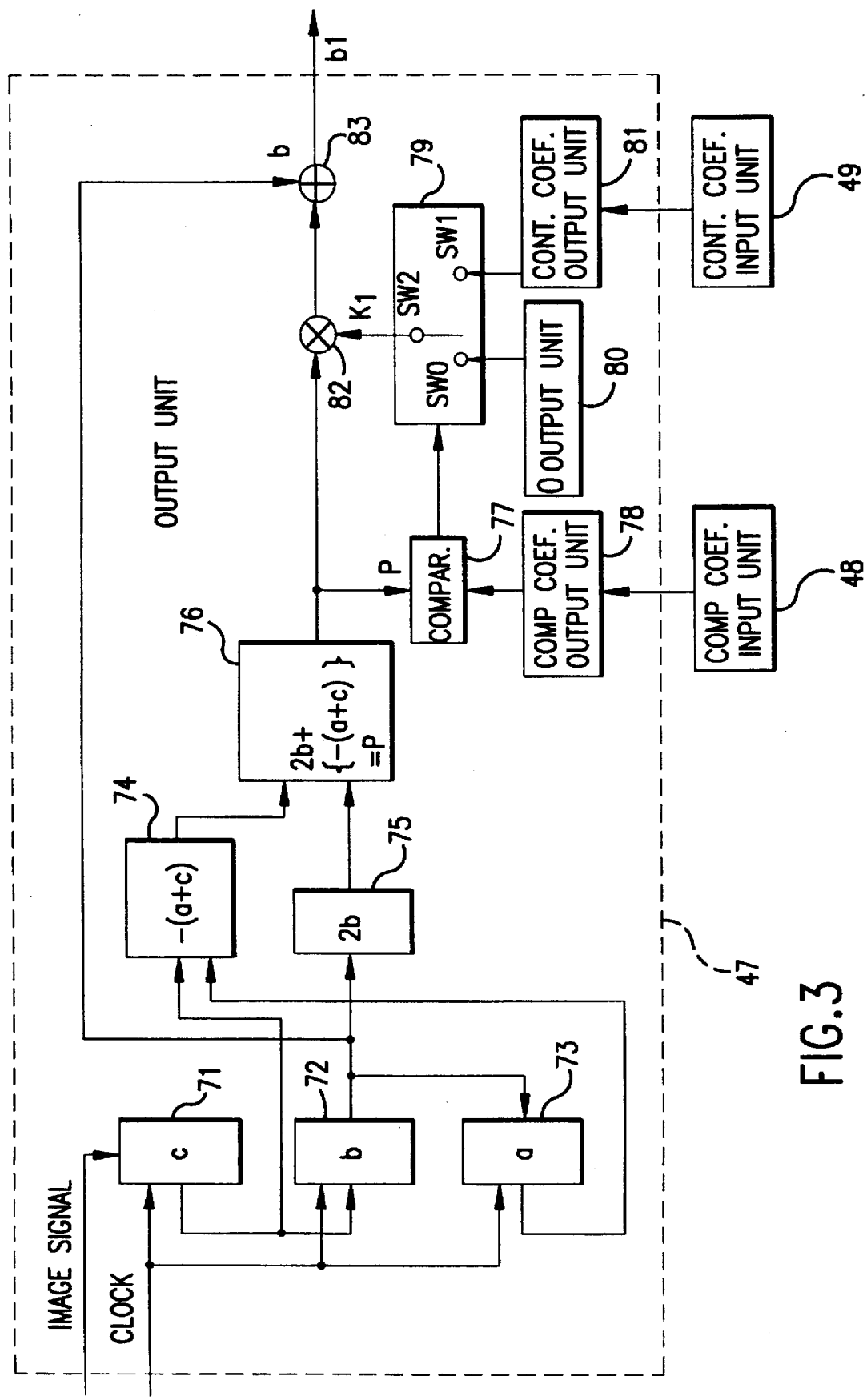
FIG. 3 is a block diagram showing the detailed structure of the edge contrast unit shown in FIG. 1.

A detailed description of the edge contrast unit of FIG. 1 is provided hereafter. FIG. 3 is a block diagram showing the detailed structure of the edge contrast unit 46 of FIG. 1, particularly the computation unit 47 therein. The computation unit 47 includes registers 71, 72 and 73, which successively store signals input from the CCD signal processor 45; an addition and sign changing unit 74, which adds the signal stored in register 73 and the signal stored in register 71, changes the sign of the added value and outputs the resulting signal; an addition unit (multiplication unit) 75, which doubles the signal stored in register 72 and outputs the result; and an addition unit 76, which adds the signal output from the addition and sign changing unit 74 and the signal output from the addition unit 75.

The computation unit 47 also includes a comparison coefficient output unit 78, which stores and outputs the comparison coefficient T0 input from the comparison coefficient input unit 48; a comparator 77, which compares the comparison coefficient T0 output from the comparison coefficient output unit 78 and the absolute value of the signal output from the addition unit 76, and outputs a signal corresponding to the results of this comparison; a contrast coefficient output unit 81, which stores and outputs the contrast coefficient K input from the contrast coefficient input unit 49; and a 0 output unit 80, which outputs 0 as the contrast coefficient K.

The computation unit 47 is controlled by a control signal output from the comparator 77, and is equipped with a selector 79. Selector 79 selects between the signal output from the 0 output unit 80 (i.e., 0) and the signal output from the contrast coefficient output unit 81 (i.e., K) based on the output of comparator 77. The computation unit 47 also includes a multiplication unit 82, which multiplies the signal output from the selector 79 and the signal output from the addition unit 76; and an addition unit 83, which adds the signal output from the multiplication unit 82 and the signal output from register 72 and outputs the result of this addition.

A description of the operations of the computation unit 47 follows. The comparison coefficient T0 input from the comparison coefficient input unit 48 is stored in the comparison coefficient output unit 78. Similarly, the contrast coefficient K input from the contrast coefficient input unit: 49 is stored in the contrast coefficient output unit 81. In addition, a 0 is stored beforehand in the 0 output unit 80.

The signal output from the CCD signal processor 45 (a signal corresponding to information from one pixel in the CCD line sensor 43) is input into the computation unit 47 simultaneously with an image input clock signal, for example, output from the CPU 54. Simultaneously, the signal previously stored in register 73 is output to the addition and sign changing unit 74. In addition, the signal previously stored in register 72 is transferred to register 73, and the signal previously stored in register 71 is transferred to register 72. In addition, the signal input from the CCD signal processor 45 is input into register 71 and stored therein. In this manner, signals from three consecutive pixels in the CCD line sensor 43 are stored in succession in registers 73, 72 and 71.

A description of the computation process for signals stored in registers 71, 72 and 73 follows, in which the signals will be referred to as signals c, b, and a, respectively. The signal a stored in register 73 and the signal c stored in register 71 are input into the addition and sign changing unit 74 and are there added together. Furthermore, in unit 74, a minus sign is attached so that the signal $(-(a+c))$ is output to the addition unit 76. In addition, the signal b stored in register 72 is input into the addition unit 75, and is added to the same signal b so that the signal (2·b) is output to the addition unit 76.

Furthermore, in the addition unit 76 the signal $(-(a+c))$ sent from the addition and sign changing unit 74 and the signal (2·b) sent from the addition unit 75 are added together, and the signal $(P=2\cdot b-(a+c))$ is output.

Next, the signal P output from the addition unit 76 is input into the comparator 77 and into the multiplication unit 82.

First, the absolute value of the signal level of the signal P input into the comparator 77 is compared with the signal level of the signal T0 corresponding to the comparison coefficient T0 received from the comparison coefficient output unit 78. When the absolute value of the signal P is smaller than the signal T0, a signal corresponding to a 0 (that is, a LOW signal), for example, is output to the selector 79. When the absolute value of the signal P is larger than or equal to the signal T0, a signal corresponding to a 1 (that is, a HIGH signal), for example, is output to the selector 79. Thus, comparator 77 generates an edge contrast performance signal to selector 79. The edge contrast performance signal has either a LOW value or a HIGH value.

Once the signal output from the comparator 77 is received by the selector 79, the selector 79 connects the output terminal SW2 and either input terminal SW0 or SW1 in accordance with the signal (LOW or HIGH) output from the comparator 77.

When the signal input into the selector 79 from the comparator 77 is a signal corresponding to a 0 (LOW), the output terminal SW2 and the input terminal SW0 are connected. Furthermore, a signal indicating that the contrast coefficient K1=0 is output to the multiplication unit 82 from output unit 80 via the input terminal SW0 and the output terminal SW2.

Conversely, when the signal input into the selector 79 from the comparator 77 is a signal corresponding to a 1 (HIGH), the output terminal SW2 and the input terminal SW1 are connected. Furthermore, a signal indicating that the contrast coefficient K1=K is output to the multiplication unit 82 from the contrast coefficient output unit 81 via the input terminal SW1 and the output terminal SW2.

The signal P output from the addition unit 76 and the signal K1 output from the selector 79 are input into the multiplication unit 82 and are there multiplied together (P1=P·K1). A signal P1 corresponding to the result of this multiplication is output to the addition unit 83.

Furthermore, the signal b output from register 72 and the signal P1 output from the multiplication unit 82 are input into the addition unit 83, and are there added together (b1=b+P1). The signal b1 that is the result of this addition is output to the normalizing processor 50.

In this way, when the signal output from the comparator 77 is comprised of a signal corresponding to 0, i.e. when |P|<T0, the contrast coefficient K1 is 0, P1=P·K1=0, and b1=b+P1=b+0=b, so that a signal corresponding to b is output from the addition unit 83. Accordingly, when |P|<T0, no edge contrast operation is performed.

When the next signal from the CCD signal processor 45 is input into the computation unit 47, the same computation as described above is performed and the signal b1 that is the result of this computation is output to the normalizing processor 50. By repeating such computations for each of the elements 61 arranged in the CCD line sensor 43, it is possible to accomplish edge contrast on a signal corresponding to the image from one line in the primary scanning direction of the image on the original received by the CCD line sensor 43.

Furthermore, by repeatedly moving the original 42 a preset distance in the secondary scanning direction and accomplishing the same edge contrast on the signals corresponding to the image from one line received by the CCD line sensor 43 and then moving the original 42 a preset distance in the secondary scanning direction and there accomplishing the same edge contrast, it becomes possible to accomplish edge contrast for all parts of the image of the original 42.

Figure 4:
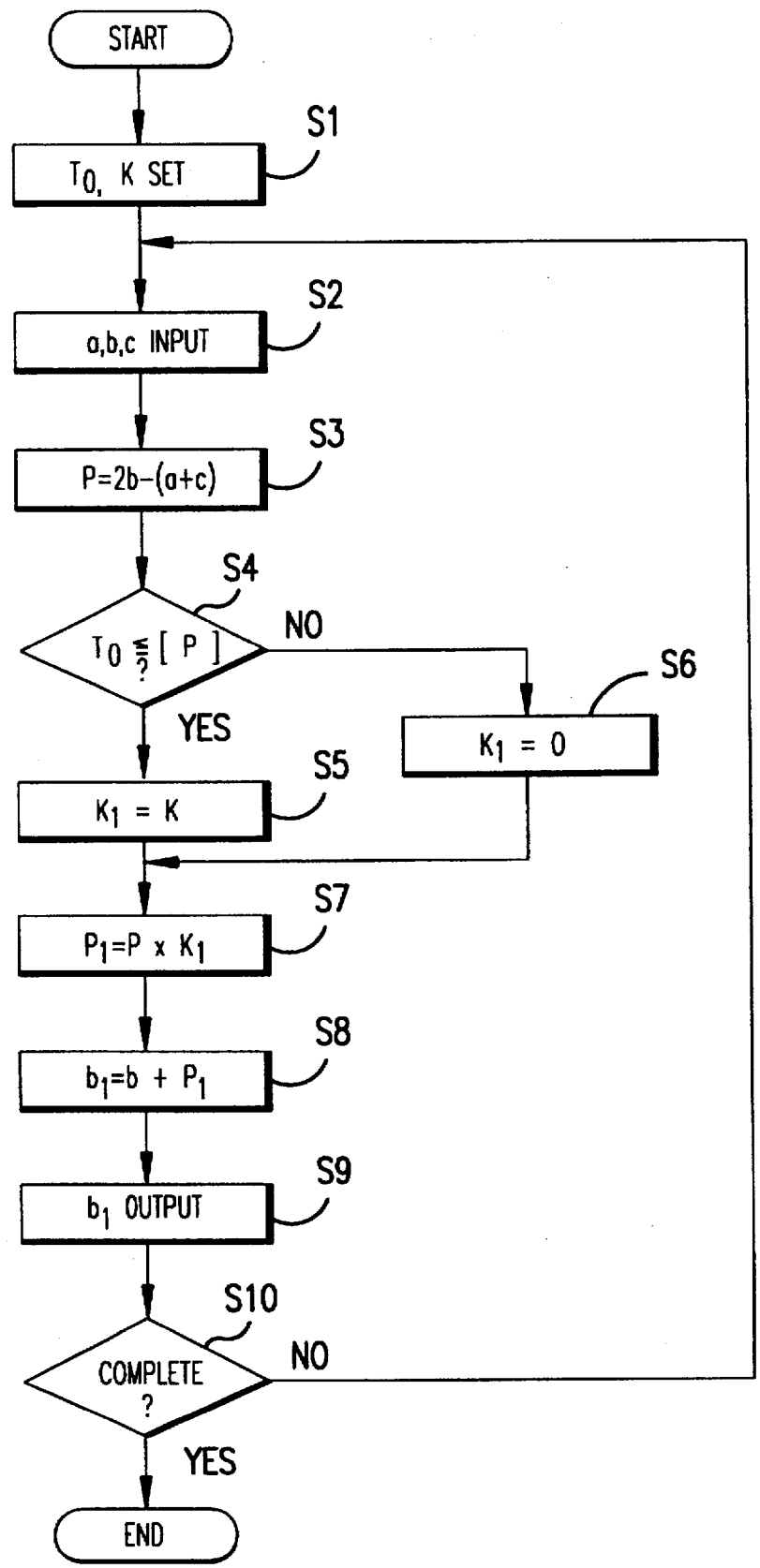
FIG. 4 is a flowchart of the process executed by the edge contrast unit shown in FIG. 3.
Figure 5:
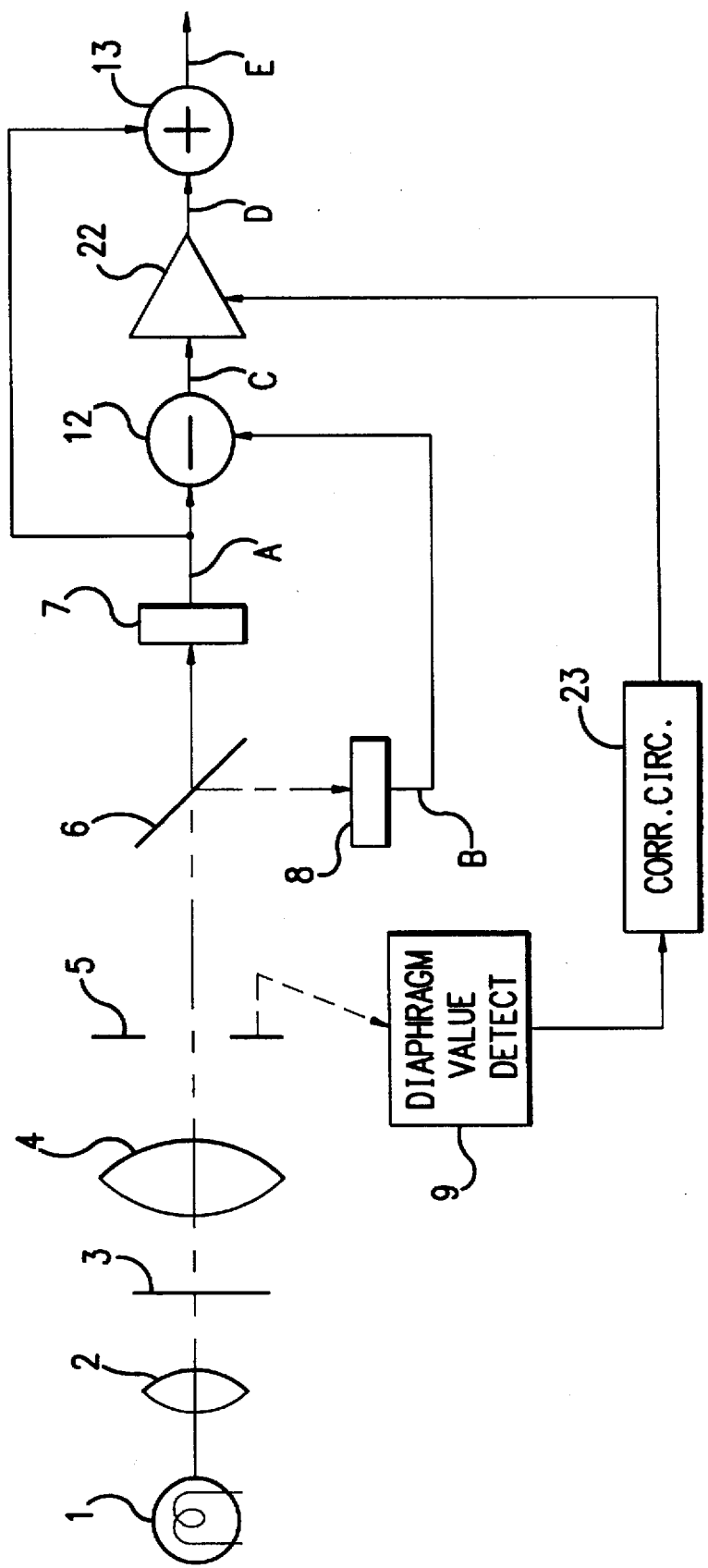
FIG. 5 shows the structure of one type of conventional image reading device.

FIG. 4 is a flowchart used to explain the processing method of edge contrast. First, in step S1, the comparison coefficient T0 and the contrast coefficient K input by the user are stored in the comparison coefficient output unit 78 and the contrast coefficient output unit 81, respectively. Following this, the image processing circuit advances to step S2.

In step S2, signals output from elements 61 in the CCD line sensor 43 corresponding to three adjacent areas of the image on the original 42 in the primary scanning direction are input into registers 71, 72, 73 as detailed above. Following this, the image processing circuit advances to step S3. Here, these signal levels will be referred to as signals a, b and c as before. The reading of the signals a, b and c is performed by registers 73, 72 and 71, respectively.

In step S3, the signal P (=2·b−(a+c)) is calculated using the signals a, b and c input in step S2. This computation is performed by the addition and sign changing unit 74 and by the addition units 75 and 76. Next, the image processing circuit advances to step S4.

In step S4, a determination is made as to whether the comparison coefficient T0 is smaller than or equal to the absolute value of the signal P calculated in step S3, the determination being accomplished by the comparator 77. When the comparison coefficient T0 is equal to or smaller than the signal P calculated in step S3 (YES in step S4), the image processing circuit advances to step S5. In step S5, the contrast coefficient K1 is set as the contrast coefficient K input in step S1. This setting is accomplished by connecting the output terminal SW2 and the input terminal SW1 in the selector 79. Following this, the image processing circuit advances to step S7.

When the comparison coefficient T0 in step S4 is greater than the signal P calculated in step S3 (NO in step S4), the image processing circuit advances to step S6, where the contrast coefficient K1 is set to 0. This setting is accomplished by connecting the output terminal SW2 and the input terminal SW0 in the selector 79, following which the image processing circuit advances to step S7.

In step S7, the signal P and the contrast coefficient K1 are multiplied together by the multiplication unit 82, the result of which multiplication is referred to as signal P1. The image processing circuit then advances to step S8.

In step S8, the signal b obtained in step S2 and the signal P1 obtained in step S7 are added together by the addition unit 83, the result of which addition is referred to as the signal b1. The image processing circuit advances to step S9.

In step S9, the signal b1 calculated in step S8 is output. The image processing circuit then advances to step S10.

In step S10, a determination is made as to whether the described process has been performed for signals output from all of the elements 61 in the CCD line sensor 43. When a determination is made that the described process has not been performed for signals output from all of the elements 61, the image processing circuit repeats the process from step S2 on. When a determination is made that the above-described process has been performed for signals output from all of the elements 61, the process is terminated.

A description of the described signals a, b and c, the contrast coefficient K, and the comparison coefficient T0 using concrete numerical values follows. In this example, the signal a=0, the signal b=1, the signal c=10, the comparison coefficient T0=5 and the contrast coefficient K=1.

When edge contrast computations are performed with these numerical values, the signal P (=2·b−(a+c)) becomes −8, so that the comparison coefficient T0 is smaller than the absolute value of the signal P. Accordingly, the value K (1 in this case) is set as the contrast coefficient K1, and the signal b1 (=b+P·K1) becomes −7. In this way, the signal b (1 in this case) is replaced by the signal b1 (−7 in this case), so that the signal has undergone contrast adjustment to form a sharp edge (between a(=0) and c(=10)).

Next, a case is described wherein a, b, c and k are the same as above and the comparison coefficient T0 is set at 20. Accomplishing the edge contrast calculation in the same manner, the signal P becomes −8 and the comparison coefficient T0 becomes greater than the absolute value of the signal P. Accordingly, the contrast coefficient K1 is set to 0 and the signal b1 becomes 1, so that no contrast adjustment occurs and the original data is left unchanged.

In this way, it is possible to either perform edge contrast or not perform edge contrast based on the value of the comparison coefficient T0 preset by the user, even when the output signals from the CCD line sensor are the same. By setting the comparison coefficient T0 as a small value, it becomes possible to perform edge contrast adjustment even on relatively small edge areas in signals output from the CCD line sensor 43. By setting the comparison coefficient T0 to be a large value, it becomes possible to perform edge contrast adjustment only on relatively large contrast edge areas in signals output from the CCD line sensor 43.

In addition, by setting the contrast coefficient K to a value larger than 1, it is possible to make the edge contrast level larger. By setting the contrast coefficient K to a value smaller than 1, it becomes possible to make the edge contrast level smaller.

In the above-described embodiment, the edge contrast process was performed by correcting the signal level of the signal output from the center of three adjacent elements lined up in the primary scanning direction of the CCD line sensor 43 on the basis of the signal level of the signals output from these three elements. However, it is also possible to accomplish the edge contrast process by correcting the signal level of the signal output from the center of five adjacent elements lined up in the primary scanning direction of the CCD line sensor 43 on the basis of the signal level of the signals output from these five elements. Naturally, in this case, the structure of the computation unit 47 shown in FIG. 3 would need to be altered, such as by increasing the number of registers to five. The signal levels of the signals output from the five adjacent elements lined up in the primary scanning direction on the CCD line sensor 43 would be referred to as a, b, c, d, and e. In this case, the corrected value corresponding to the signal output from the center element is a value determined by finding the sum of the signal levels of the signals output from the four elements adjacent on both sides (a+b+d+e), and subtracting this value from four times the value of the signal level c (i.e., 4c) of the signal output from the center element. Accordingly, calling P5 the corrected value corresponding to the signal level of the signal output from the center element, the corrected value P5 can be expressed as:

$$P5=4c-(a+b+d+e).$$

In addition, as explained above, the signal levels of the signals output from the three adjacent elements lined up in the primary scanning direction on the CCD line sensor 43 are referred to as a, b, and c. In this case, the corrected value P corresponding to the signal output from the center element is a value computed by finding the sum of the signal levels of the signals output from the two elements adjacent on both sides (a+c), and subtracting this value from two times the value of the signal level b of the signal output from the center element (2·b). Accordingly, calling P the corrected value corresponding to the signal level of the signal output from the center element, this corrected value P can be expressed as:

$$P=2\cdot b-(a+c).$$

In this instance, when the signal level of the signal output from the center element is corrected on the basis of signals output from N adjacent elements (N being a natural number) in the CCD line sensor 43, the number of elements N is defined to be the window size.

The corrected value P5 when the window size is five is approximately twice the size of the corrected value P when the window size is three. In other words, when the window size is increased from three to five, the level of strength is doubled in real terms.

In addition, it is possible to set three modes as the image reading mode, namely a fast scanning mode, a normal scanning mode and an HQ (high quality) scanning mode.

In the HQ scanning mode, the analog gain provided by the gain control amplifier 59 in FIG. 1 is set to a minimum. Furthermore, in this state exposure correction is accomplished by controlling the integration time (accumulation time) of the CCD line sensor 43.

In the normal scanning mode, the analog gain provided by the gain control amplifier 59 is set at about 20% (for example, step 3) of the difference between the minimum value of the possible analog gain settings (for example, step 1) and the maximum value (for example, step 8). In this state, exposure correction also is accomplished by controlling the integration time of the CCD line sensor 43.

In contrast to these modes, in the fast scanning mode, the scanning speed is first set giving priority to a preset speed. Furthermore, the integration time of the CCD line sensor 43 is fixed as a set time. In addition, exposure control is accomplished by a LUT 52 and a gain control amplifier 59 having a total of eight possible analog gain levels. Consequently, it is possible to realize a case in which the analog gain is set to a relatively large value by the gain control amplifier 59.

In this case, there is the possibility that the S/N (signal to noise) ratio will worsen in terms of the electrical signal level output by the gain control amplifier 59 in comparison to the normal scanning mode or the HQ scanning mode.

Accordingly, in the fast scanning mode, it is necessary to make the parameters (i.e., the contrast coefficient K and comparison coefficient T0) smaller in comparison with the other modes in order to regulate the edge contrast level.

In consideration of the foregoing, by combining the contrast level, the comparison coefficient T0 and the window size, which comprise the parameters for regulating the edge contrast level, it becomes possible to set the edge contrast level at five levels, ranging from 1 to 5. In this instance, the contrast level is defined in 8 levels ranging from 0 to 7 and corresponds to the contrast coefficient K. In other words, the levels of contrast 0, 1, 2, 3, 4, 5, 6 and 7 correspond to contrast coefficients K having values $2^{-5}$, $2^{-4}$, $2^{-3}$, $2^{-2}$, $2^{-1}$, $2^0$, $2^1$ and $2^2$, respectively.

Accordingly, when the contrast level is 0, in actuality the value $2^{-5}$ is set as the value of the contrast coefficient K in step S1 of the above-described flowchart shown in FIG. 4, following which the process is accomplished from step S2 on as detailed above.

For example, when the contrast level is taken to have 8 settings as described above, the comparison coefficient T0 can have 256 settings ranging from 0 to 255 and the window size can have two settings of either 3 or 5. Furthermore, in the case of the fast scanning mode, it is possible to stipulate an edge contrast of 1, e.g. contrast=0, comparison coefficient T0=255 and window size=3. Similarly, it is possible to stipulate an edge contrast of 2, e.g. contrast=2, comparison coefficient T0=0 and window size=3. In addition, it is possible to stipulate an edge contrast of 3, e.g. contrast=1, comparison coefficient T0=0 and window size=5.

Similarly, it is possible to stipulate an edge contrast of 4, e.g. contrast=2, comparison coefficient T0=0 and window size=5. And in addition, it is possible to stipulate an edge contrast of 5, e.g. contrast=3, comparison coefficient T0=0 and window size=5.

In addition, in the case of the normal scanning mode and HQ scanning mode, it is possible to stipulate an edge contrast of 1, e.g., contrast=0, comparison coefficient T0=255 and window size=3. Similarly, it is possible to stipulate an edge contrast of 2, e.g. contrast=3, comparison coefficient T0=0 and window size=3. And furthermore, it is possible to stipulate an edge contrast of 3, e.g. contrast=2, comparison coefficient T0=0 and window size=5.

Similarly, it is possible to stipulate an edge contrast of 4, e.g., contrast=3, comparison coefficient T0=0 and window size=5. And, in addition, it is possible to stipulate an edge contrast of 5, e.g., contrast=4, comparison coefficient T0=0 and window size=5.

By storing the values of the parameters set in this way beforehand in the ROM 55, for example, and reading them with the CPU 54, the CPU 54 can automatically set the contrast coefficient K and the comparison coefficient T0 when the user indicates the scanning mode and edge contrast level using operation buttons, e.g., provided on the outer housing of the image reading device.

In other words, the user indicates one out of the fast scanning mode, the normal scanning mode or the HQ scanning mode by operating an operation button, and then indicates one out of the 1–5 edge contrast level values by operating an operation button.

The CPU 54 can read from the ROM 55 the contrast level, the comparison coefficient T0 and the window size that correspond to the scanning mode and edge contrast level indicated by the operation of the operation button following a preset application program. In addition, as explained above, the contrast level has a preset mutual relationship with the contrast coefficient, because of which the CPU 54 can convert the contrast level into the contrast coefficient K on the basis of this mutual relationship. Furthermore, the comparison coefficient T0 is set in the comparison coefficient output unit 78 of the computation unit 47, and the contrast coefficient K is set in the contrast coefficient output unit 81, thereby executing the process shown in the flowchart in FIG. 4, edge contrast being accomplished for the preset scanning mode and edge contrast level.

Accordingly, the user can accomplish edge contrast corresponding to a preset scanning mode and the edge contrast level through a simple operation.

In the above-described embodiment, it is possible for the user to indicate five levels of edge contrast by operating an operation button. However, by altering the application program it is also possible to indicate other than five edge contrast levels.

In addition, it is also possible to enable arbitrary values to be indicated for the contrast level, the comparison coefficient T0 or the window size by an operator inputting specific corresponding numerical values, using an operation button.

In addition, the edge contrast process in the above-described embodiment was explained only with regard to signals from adjacent elements lined up in the primary scanning direction. However, obviously it is also possible to accomplish this process relative to adjacent elements in the secondary scanning direction, or for elements in a spatial arrangement, such as 3×3 or 5×5. In addition, this process can also be realized in a device wherein a two dimensional sensor is used instead of a line sensor having a single row of elements 61.

As explained above, with the image reading device according to the present invention, edge contrast is accomplished by an edge contrast device on signals output from a photosensor device in accordance with the determination of a determination device. Accordingly, it is possible to selectively accomplish edge contrast on the relatively high quality portions of the image, and it is possible to suppress edge contrast on noise and roughness in the image.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image reading device comprising:
   a light source that illuminates an original document that is to be read;
   a photosensor device including a plurality of photosensor elements, each of said photosensor elements outputting a signal corresponding to an amount of light received by said photosensor element from the original document; a calculation circuit coupled to said photosensor device, said calculation circuit performing a predetermined calculation using the signal output by a first one of said plurality of photosensor elements and the signal output by at least one of said plurality of photosensor elements arranged in a vicinity of said first photosensor element and outputting a calculation value;
   a determination circuit coupled to said calculation circuit, said determination circuit outputting an edge contrast performance signal that indicates that an edge contrast operation is to be performed on the signal output by said first photosensor element when said calculation value is larger than a preset comparison coefficient; and
   an edge contrast circuit coupled to said determination circuit, said edge contrast circuit performing an edge contrast operation on the signal output from said first one of said plurality of photosensor elements in accordance with the edge contrast performance signal output by said determination circuit.

2. An image reading device according to claim 1, wherein said calculation circuit is a difference determining circuit that determines a difference between a multiple of the value of the signal output by said first one of said plurality of photosensor elements and a sum of the values of the signals output by said photosensor elements located adjacent to said first photosensor element in order to output the calculation value.

3. An image reading device according to claim 1, further comprising an input device that enables said preset comparison coefficient to be changed.

4. An image reading device according to claim 3, wherein said input device enables the preset comparison coefficient to be changed between a plurality of preset values.

5. An image reading device according to claim 1, wherein said plurality of photosensor elements of said photosensor device are arranged in a linear array.

6. An image reading device according to claim 1, wherein said calculation circuit outputs the calculation value based upon a value of the signal output from said first one of said plurality of photosensor elements, a value of the signal output by at least one second photosensor element located immediately adjacent to a first side of said first photosensor element, and a value of the signal output by at least one third photosensor element located immediately adjacent to a second side of said first photosensor element.

7. An image reading device according to claim 6, wherein said second side of said first photosensor element is located opposite from said first side of said first photosensor element.

8. An image reading device according to claim 1, further comprising a contrast coefficient input device that enables a contrast coefficient to be changed, and wherein said edge contrast circuit uses said contrast coefficient in performing the edge contrast operation on the signal output from said first photosensor element.

9. An image reading device according to claim 1, wherein said determination circuit outputs one of the edge contrast performance signals for each of said plurality of photosensor elements in said photosensor device, and said edge contrast circuit performs the edge contrast operation on the signals output from each of said plurality of photosensor elements in said photosensor device in accordance with the edge contrast performance signals output by said determination circuit.

10. An image reading device comprising:
    light-supplying means for illuminating an original document that is to be read;
    photosensor means for converting light received from the original document into electrical signals, said photosensor means having a plurality of photosensor elements, each of which outputs a signal corresponding to an amount of light received from the original document;
    calculation means for calculating and outputting a calculation value for each of said plurality of photosensor elements based on the signal output by each of the plurality of photosensor elements and the signal output by at least one of said plurality of photosensor elements arranged in a vicinity of each photosensor element;
    determination means for determining and outputting an edge contrast performance signal for each of said plurality of photosensor elements, said edge contrast performance signal indicating that an edge contrast operation is to be performed on the signal output by each photosensor element when said calculation value is larger than a preset comparison coefficient; and
    edge contrast means for performing an edge contrast operation on each of the signals output from said photosensor elements in accordance with the determination made by said determination means for each of said photosensor elements.

11. An image reading device according to claim 10, further comprising input means for enabling said preset comparison coefficient to be changed.

12. An image reading device according to claim 11, wherein said input means enables the comparison coefficient to be changed between a plurality of preset values.

13. An image reading device according to claim 10, wherein said calculation means calculates the calculation value for each of said plurality of photosensor elements by calculating a difference between a multiple of the value of the signal output by said photosensor element and a sum of the values of the signals output by said photosensor elements located adjacent to said photosensor element.

14. An image reading device according to claim 10, wherein for each of said plurality of photosensor elements, said calculation means calculates said calculation value based upon the value of the signal output by said photosensor element and values of the signals output by at least two other photosensor elements located adjacent to said photosensor element.

15. An image reading device according to claim 10, wherein said plurality of photosensor elements of said photosensor means are arranged in a linear array.

16. An image reading device according to claim 10, wherein for each of said plurality of photosensor elements, said calculation means calculates said calculation value based upon the value of the signal output by said photosensor element and on the values of the signals output by photosensor elements located immediately adjacent to said photosensor element.

17. An image reading device according to claim 16, wherein said immediately adjacent photosensor elements are located on opposite sides of said photosensor element for which said determination is being made.

18. An image reading device according to claim 10, further comprising means for enabling a contrast coefficient to be changed, and wherein said edge contrast means uses said contrast coefficient in performing the edge contrast operation.

19. A method of performing an edge contrast operation in an image reading device having a light source and a photosensor device, said light source illuminating an original document that is to be read, light from the original document being received by a plurality of photosensor elements of said photosensor device, each of said photosensor elements outputting a signal corresponding to an amount of light received from the original document, said method comprising the steps of:

calculating a calculation value based on the signal output by a first one of said plurality of photosensor elements and at least one of said plurality of photosensor elements arranged in a vicinity of said first photosensor element;

determining that an edge contrast operation is to be performed on the signal output by said first photosensor element when said calculation value is larger than a preset comparison coefficient; and performing the edge contrast operation on the signal output from said first one of said plurality of photosensor elements in accordance with said determination.

20. A method according to claim 19, wherein said calculating step includes calculating the calculation value by calculating a difference between a multiple of the value of the signal output by said first one of said plurality of photosensor elements and a sum of the values of the signals output by said photosensor elements located adjacent to said first photosensor element.

21. A method according to claim 19, wherein said calculating step includes calculating said calculation value based upon the value of the signal output by said first one of said plurality of photosensor elements and values of the signals output by at lest two other photosensor elements located adjacent to said first photosensor element.

22. A method according to claim 19, wherein said determining step includes determining whether to perform the edge contrast operation for signals output by each of said plurality of photosensor elements in said photosensor device, and said edge contrast operation is performed on the signals output by each of said plurality of photosensor elements in said photosensor device in accordance with the determinations made for each of said photosensor elements.

* * * * *